Patented Feb. 25, 1941                                                    2,232,869

UNITED STATES PATENT OFFICE 2,232,869

CONCENTRATION OF OLEFINS

Richard F. Robey, Roselle, N. J., assignor to Standard Oil Development Company, a corporation of Delaware No Drawing. Application December 30, 1938, Serial No. 248,470

13 Claims. (Cl. 260—677)

This invention relates to improvements in methods of concentrating olefins from mixtures in which they occur and particularly in methods of separating and concentrating olefins from gaseous mixtures of olefins and paraffins.

Mixtures of olefins and paraffins that are obtained by cracking or subjecting petroleum hydrocarbons to high temperatures are found to contain acetylene. When ammoniacal or basic cuprous salt solutions are used to separate the olefins from the paraffins, acetylene reacts with the cuprous salt solution to form explosive compounds and as these mixtures of products, both of the olefins and acetylene, are subjected to higher temperatures to recover the olefins from the solutions, disastrous explosions have been known to occur.

An object of this invention is to segregate the olefins, both from the paraffins and also from acetylene without forming explosive compounds.

According to this invention, acetylene is first effectively removed from gaseous mixtures containing olefins and paraffins. A slurry of cuprous chloride in dilute hydrochloric acid and ammonium chloride solution is prepared. Through this slurry of cuprous chloride, gaseous mixtures containing acetylene are passed and a white crystalline insoluble complex compound of the acetylene with the cuprous salt is formed. The solution of cuprous chloride, which will be termed "ammonium acid-chlorocuprite solution" hereafter, also reacts with the olefins, but when the ammonium acid-chlorocuprite solution is saturated with the olefins, no more olefins will react, while, on the other hand, the acetylene will continue to form the crystalline water-insoluble compounds with the cuprous salt as long as any acetylene unreacted cuprous salts are present. The white crystalline water-insoluble compounds are non-explosive when heated and/or struck. When treated with stronger acid and/or heated and/or subjected to reduced pressure, acetylene and/or derivatives and polymers are obtained.

EXAMPLE 1

A gaseous mixture containing 1.0% acetylene was scrubbed with 400 ml. of a slurry of ammonium acid-chlorocuprite. The slurry of ammonium acid-chlorocuprite was prepared by taking equal parts of an aqueous solution containing 3 mols of hydrochloric acid per liter and of an aqueous solution containing 3 mols of ammonium chloride per liter and adding an excess of powdered cuprous chloride to form a slurry. The rate of gas flow was 44 ml. per minute through a column of 15 cm. of the ammonium acid-chlorocuprite slurry. The acetylene concentration was reduced to 0.15% with the slurry at a temperature of 25° C. and a total gas pressure of 1 atmosphere. The acetylene concentration may be reduced to less than .05% by using lower temperatures.

The gaseous mixtures, after the acetylene has been substantially removed, are then contacted with a cool, fresh ammonium acid-chlorocuprite solution, either at atmospheric or higher pressure. The concentration of hydrochloric acid used is from 2.5 to 20%, the optimum concentration being about 10%. The optimum concentration of ammonium chloride is about 3 molar although other concentrations may be used. The solutions are saturated with cuprous chloride. The acetylene-free gas is circulated through the ammonium acid-chlorocuprite solution and the olefins, particularly ethylene and propylene, are absorbed therein. The ammonium acid-chlorocuprite solution may then be subjected to heat or to decrease of pressure to recover the olefins that are combined with the cuprous salt. The effects of temperature and the concentration of hydrochloric acid are illustrated in the following table:

TABLE 1

Solubilities of ethylene and propylene in acid-cuprous solutions at atmospheric pressure

[Ml. gas (25°-760 mm.)/ml. solution]

| Temp. ° C. of solution | 0.75 mols HCl<br>1.5 mols CuCl<br>3 mols NH₄Cl | 1.5 mols HCl<br>1.85 mols CuCl<br>3 mols NH₄Cl | 3 mols HCl<br>2.35 mols CuCl<br>3 mols NH₄Cl |
|---|---|---|---|
| 40° {C₂H₄ | 1.0 | 1.25 | 1.2 |
|      {C₃H₆ | 0.25 | 0.25 | 0.0 |
| 30° {C₂H₄ | 2.25 | 2.25 | 2.7 |
|      {C₃H₆ | 0.50 | 0.75 | 0.2 |
| 20° {C₂H₄ | 3.75 | 4.0 | 4.2 |
|      {C₃H₆ | 1.0 |  | 0.5 |
| 10° {C₂H₄ | 6.25 | 6.25 | 6.4 |
|      {C₃H₆ | 1.60 |  |  |
| 0°  {C₂H₄ | 9.0 | 9.5 | 10.5 |
|      {C₃H₆ | 1.9 |  | 2.5 |

The use of lower temperatures results in the absorption of larger percentages of the olefins. The solutions thereby obtained are heated and/or the pressure lowered to liberate the olefins in substantially pure form.

EXAMPLE 2

A cracked refinery gas free of hydrogen sulfide was compressed to 550 pounds per square inch and passed to a prescrubber, the function of which is to remove acetylene, as heretofore described, as well as oxygen from the inlet gas. The prescrubber was packed with copper turnings and filled with a slurry of ammonium acid-chlorocuprite solution. The prescrubber removes all oxygen and acetylene, and an amount of copper equivalent to the oxygen is dissolved from the copper turning packing. This prevents corrosion at later stages of the operation of the equipment which is preferably constructed of copper, copper-alloy, or copper-coated metal. The gas is then passed to an olefin absorption tower operated with ammonium acid-chlorocuprite solution at 30° C. where the olefin gases, largely ethylene with some propylene, are absorbed almost preferentially. The unabsorbed gas may be discarded or used as a fuel. When the pressure on the solution from the absorption tower is released, the gases effervesce from the solution and are collected. The exhausted solution may be returned to the tower in a continuous process.

The following table gives the composition of the inlet gas, the unabsorbed gas and gas recovered from the solution by decrease of pressure:

TABLE 2

|  | Inlet gas | Unabsorbed gas | Olefin gas |
| --- | --- | --- | --- |
|  | Percent by volume | Percent | Percent |
| $H_2$ | 17 | 26.0 | 0.4 |
| $CH_4$ | 28 | 42.6 | 1.0 |
| $C_2H_4$ | 25 | 3.4 | 65.0 |
| $C_2H_6$ | 12 | 18.3 | 0.4 |
| $C_3H_6$ | 13 | 3.7 | 30.0 |
| $C_3H_8$ | 3 | 4.5 | 0.1 |
| $C_4$ | 2 | 1.3 | 3.1 |

It has been found that in the preparation of the absorbing solutions alkali and alkaline earth metal chlorides may be substituted for ammonium acid-chlorocuprite with good results and that in some cases the addition of hydrochloric acid is not necessary for good absorption. For example, the following table shows the volumes of olefin gas absorbed by a unit volume of a solution of cuprous chloride in an aqueous solution of calcium chloride (3 mols per liter) at various temperatures. The partial pressure of olefin is one atmosphere in each case.

TABLE 3

| Temp. ° C. | Solubility volumes gas (25°-760 mm.) per volume of solution | |
| --- | --- | --- |
|  | $C_2H_4$ | $C_3H_6$ |
| 30 | 2.0 | 0.4 |
| 20 | 3.2 | 0.6 |
| 10 | 4.8 | 0.9 |
| 0 | 6.8 | 1.3 |

The particular advantages of these solutions are their low vapor pressures, whereby the olefins may be stored in vessels of light construction. Heavy walled containers are not required to store and transport the olefins. The containers with the cuprous solution therein may be used both to separate the olefins and store them in a high state of purity.

The invention is not to be limited to the specific embodiments shown or the specific examples given, nor to any theories advanced as to the operation of the invention, but in the appended claims it is intended to claim all inherent novelty in the invention as broadly as the prior art permits.

I claim:

1. A process for the recovery of olefins from gaseous mixtures containing the same, which comprises the steps of treating a gaseous mixture containing normally gaseous olefins and acetylene with an olefin-saturated slurry of cuprous chloride in dilute hydrochloric acid and ammonium chloride at a temperature of 0° to 40° C., separating the gaseous mixture and treating with a solution of cuprous chloride in hydrochloric acid and ammonium chloride at a temperature of 0° to 40° C., subjecting the solution of cuprous chloride, hydrochloric acid and the ammonium chloride to heat and liberating the olefins.

2. A process for the segregation of olefins from a hydrocarbon gaseous mixture containing acetylene, which comprises the steps of treating the gaseous mixture containing normally gaseous olefins and acetylene with an olefin saturated slurry of cuprous chloride in dilute hydrochloric acid and ammonium chloride at a temperature of 0° to 40° C., separating the resulting gaseous mixture and treating with a solution of cuprous chloride, hydrochloric acid and ammonium chloride at a temperature of 0° to 40° C. and liberating olefins from the resulting solution.

3. A process for the recovery of olefins from gaseous mixtures containing olefins, acetylene and paraffins, which comprises the steps of treating the said gaseous mixture with a normally gaseous olefin-saturated slurry of cuprous chloride in dilute hydrochloric acid and ammonium chloride at a temperature of 0° to 40° C., separating the resulting gaseous mixture and contacting with a solution of cuprous chloride in hydrochloric acid of 2.5 to 20% concentration and ammonium chloride at a temperature of 0° to 30° C. and liberating the olefins from the resulting solution.

4. A process for the segregation of olefins from a mixture of normally gaseous olefins, paraffins and acetylene, which comprises the steps of contacting the gaseous mixture with an olefin saturated slurry of cuprous chloride in 10% hydrochloric acid and ammonium chloride at a temperature of 0° to 40° C., separating the gaseous mixture and contacting the separated gaseous mixture with a solution of cuprous chloride in hydrochloric acid of 10% concentration and ammonium chloride at a temperature of 0° to 40° C. and liberating olefins from the resulting solution by means of heat.

5. A process for the segregation or olefins according to claim 4 in which a decrease of pressure is used to liberate the olefins from the resulting solution.

6. A process for the separation of olefins from gaseous mixtures containing the same, which comprises the steps of treating a gaseous mixture containing normaly gaseous olefins, acetylene and oxygen with an olefin-saturated slurry of cuprous chloride in an aqueous solution of hydrochloric acid and ammonium chloride at a temperature of 0° to 40° C., separating the gaseous mixture and treating with a solution of cuprous chloride in an aqueous solution of hydrochloric acid and ammonium chloride at a temperature of 0° to 40° C., subjecting the said solution to heat and separating olefins.

7. A process for the separation of olefins from gaseous mixtures containing olefins and paraffins, which comprises the steps of contacting a gaseous mixture of normally gaseous olefins, paraffins, acetylene and oxygen with an olefin-saturated slurry of cuprous chloride in an aqueous solution containing from 2.5% to 20% of hydrochloric acid and 3 mols per liter of ammonium chloride at a temperature of 0° to 40° C., separating the unreacted gaseous mixture, contacting the separated unreacted gaseous mixture with a solution consisting of cuprous chloride dissolved in an aqueous solution of alkali chloride at a temperature of 0° to 40° C., separating the solution consisting of cuprous chloride dissolved in an aqueous solution of an alkali chloride and liberating olefins from the separated solution consisting of cuprous chloride and alkali chloride.

8. A process according to claim 7 in which the separated olefins are ethylene and propylene.

9. A process for the storage of olefins which comprises the steps of separating from a mixture of normally gaseous olefins, paraffins and acetylene, the acetylene by contacting with an olefin saturated slurry of cuprous chloride at a temperature of 0° to 40° C. and 10% hydrochloric acid and ammonium chloride, separating the olefins from the paraffins by dissolving the olefins in a solution of cuprous chloride and hydrochloric acid of 10% concentration and ammonium chloride at a temperature of 0° to 40° C. and retaining the olefins in said solution.

10. A process for the storage of olefins which comprises the steps of treating a gaseous mixture containing normally gaseous olefins, acetylene, oxygen and paraffins with an olefin saturated slurry of cuprous chloride in an aqueous solution of hydrochloric acid and ammonium chloride at a temperature of 0° to 40° C., separating the gaseous mixture and absorbing from said separated gaseous mixture with a solution of cuprous chloride at a temperature of 0° to 40° C. the olefins and retaining the olefins therein.

11. A process for the storage of olefins which comprises the steps of contacting a gaseous mixture of normally gaseous olefins, paraffins, acetylene and oxygen with an olefin saturated slurry of cuprous chloride in an aqueous solution containing from 2.5% to 20% of hydrochloric acid and 3 mols per liter of ammonium chloride at a temperature of 0° to 40° C., separating the unreacted gaseous mixture, contacting the separated unreacted gaseous mixture with a solution of cuprous chloride dissolved in an aqueous solution of alkali chloride at a temperature of 0° to 40° C., separating the solution consisting of cuprous chloride dissolved in an aqueous solution of alkali chloride and retaining the olefins therein.

12. A process for the separation of olefins from gaseous mixtures containing olefins and paraffins, which comprises the steps of contacting a gaseous mixture of normally gaseous olefins, paraffins, acetylene and oxygen with an olefin-saturated slurry of cuprous chloride in an aqueous solution containing from 2.5% to 20% of hydrochloric acid and 3 mols per liter of ammonium chloride at a temperature of 0° to 40° C., separating the unreacted gaseous mixture, contacting the separated unreacted gaseous mixture with a solution consisting of cuprous chloride dissolved in an aqueous solution of alkaline earth chloride at a temperature of 0° to 40° C., separating the solution consisting of cuprous chloride dissolved in an aqueous solution of an alkaline earth chloride and liberating olefins from the separated solution consisting of cuprous chloride and alkaline earth chloride.

13. A process for the separation of olefins from gaseous mixtures containing olefins and paraffins, which comprises the steps of contacting a gaseous mixture of normally gaseous olefins, paraffins, acetylene and oxygen with an olefin-saturated slurry of cuprous chloride in an aqueous solution containing from 2.5% to 20% of hydrochloric acid and 3 mols per liter of ammonium chloride at a temperature of 0° to 40° C., separating the unreacted gaseous mixture, contacting the separated unreacted gaseous mixture with a solution consisting of cuprous chloride dissolved in an aqueous solution of calcium chloride at a temperature of 0° to 40° C., separating the solution consisting of cuprous chloride dissolved in an aqueous solution of a calcium chloride and liberating olefins from the separated solution consisting of cuprous chloride and calcium chloride.

RICHARD F. ROBEY.